US012809055B2

(12) United States Patent
Song et al.

(10) Patent No.: US 12,809,055 B2
(45) Date of Patent: Nov. 24, 2026

(54) CAMERA COMPRISING META LENS AND WEARABLE ELECTRONIC DEVICE COMPRISING SAME CAMERA

(71) Applicant: SAMSUNG ELECTRONICS CO., LTD., Suwon-si (KR)

(72) Inventors: Doukyoung Song, Suwon-si (KR); Sangeun Mun, Suwon-si (KR); Seunghoon Han, Suwon-si (KR); Jina Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 18/481,618

(22) Filed: Oct. 5, 2023

(65) Prior Publication Data

US 2024/0027797 A1 Jan. 25, 2024

Related U.S. Application Data

(63) Continuation of application No. PCT/KR2022/004472, filed on Mar. 30, 2022.

(30) Foreign Application Priority Data

Apr. 7, 2021 (KR) ........................ 10-2021-0044911

(51) Int. Cl.
*G02B 1/00* (2006.01)
*G02B 1/14* (2015.01)
(Continued)

(52) U.S. Cl.
CPC ............... *G02B 1/002* (2013.01); *G02B 1/14* (2015.01); *G02B 3/005* (2013.01); *G02B 5/003* (2013.01);
(Continued)

(58) Field of Classification Search
CPC G02B 1/002; G02B 5/1809; G02B 2207/101; G02B 1/00; G02B 1/118;
(Continued)

(56) References Cited

U.S. PATENT DOCUMENTS 5,612,085 A * 3/1997 Mitani ..................... G02B 1/11 427/430.1
6,534,340 B1 3/2003 Karpman et al.
(Continued)

FOREIGN PATENT DOCUMENTS

KR 100692779 B1 3/2007
KR 20180004112 A 1/2018
(Continued)

OTHER PUBLICATIONS

Extended European Search Report dated Jul. 18, 2024 for EP Application No. 22784844.7 (previously submitted on Oct. 7, 2024).

(Continued)

*Primary Examiner* — Matthew Y Lee
(74) *Attorney, Agent, or Firm* — Nixon & Vanderhye P.C.

(57) ABSTRACT

A wearable electronic device may include a frame, a first temple connected to one side of the frame, a second temple connected to an opposite side of the frame, and a camera located in one region of the frame. The camera may include a lens module including at least one meta-lens in which nanostructures are arranged in two dimensions and an image sensor that detects light guided by the lens module.

16 Claims, 9 Drawing Sheets

(51) Int. Cl.

| | |
|---|---|
| ***G02B 3/00*** | (2006.01) |
| ***G02B 5/00*** | (2006.01) |
| ***G02B 27/00*** | (2006.01) |
| ***G02C 5/14*** | (2006.01) |
| ***G02C 7/10*** | (2006.01) |
| ***G02C 11/00*** | (2006.01) |

(52) U.S. Cl.
CPC ........... *G02B 27/0093* (2013.01); *G02C 5/14* (2013.01); *G02C 7/104* (2013.01); *G02C 11/10* (2013.01)

(58) Field of Classification Search
CPC .......... G02B 1/14; G02B 3/005; G02B 5/003; G02B 27/0093; G02B 2027/0138; G02B 2027/0178; G02B 27/0172; G02B 27/01; G02B 27/42; B82Y 20/00; B82Y 15/00; G02C 11/10; G02C 5/14; G02C 7/104; G03B 29/00; G03B 30/00; G03B 11/043; G03B 17/12; H04N 23/55; H04N 23/54; H04N 23/57
See application file for complete search history.

(56) References Cited

U.S. PATENT DOCUMENTS

| | | | | |
|---|---|---|---|---|
| 8,872,293 | B2 | 10/2014 | Takachi | |
| RE46,836 | E | 5/2018 | Takachi | |
| 10,514,755 | B2 | 12/2019 | Cho et al. | |
| 10,678,047 | B2 | 6/2020 | Guenter | |
| 10,712,576 | B1 | 7/2020 | Mceldowney | |
| 11,092,717 | B2 | 8/2021 | Capasso et al. | |
| 11,175,182 | B2 | 11/2021 | Kim et al. | |
| 11,567,240 | B2 | 1/2023 | Han et al. | |
| 11,686,620 | B2 | 6/2023 | Kim et al. | |
| 2012/0205766 | A1* | 8/2012 | Takachi | G02B 5/282 257/E31.127 |
| 2016/0316180 | A1* | 10/2016 | Han | G02B 13/0035 |
| 2019/0064532 | A1* | 2/2019 | Riley, Jr. | G02B 27/0916 |
| 2020/0264343 | A1* | 8/2020 | Han | G02B 1/002 |
| 2021/0014394 | A1* | 1/2021 | Han | G02B 1/002 |
| 2021/0028215 | A1 | 1/2021 | Devlin et al. | |
| 2022/0050294 | A1 | 2/2022 | Fermigier et al. | |
| 2022/0052093 | A1 | 2/2022 | Devlin et al. | |
| 2022/0188539 | A1* | 6/2022 | Chan | G06V 10/95 |
| 2022/0260754 | A1 | 8/2022 | Dobashi | |
| 2023/0062193 | A1 | 3/2023 | Han et al. | |
| 2023/0319384 | A1 | 10/2023 | Han et al. | |

FOREIGN PATENT DOCUMENTS

| | | | |
|---|---|---|---|
| KR | 20180124106 | A | 11/2018 |
| KR | 20200099832 | A | 8/2020 |
| KR | 20210006842 | A | 1/2021 |
| WO | 2007043509 | A1 | 4/2007 |
| WO | 2020052881 | A1 | 3/2020 |
| WO | 2021005870 | A1 | 1/2021 |
| WO | WO 2021-021671 | A1 | 2/2021 |

OTHER PUBLICATIONS

Korean Office Action dated Mar. 19, 2025 for KR Application No. 10-2021-0044911.
International Search Report for PCT/KR2022/0044911, mailed Jul. 14, 2022, 4 pages.
Extended European Search Report dated Jul. 18, 2024 for EP Application No. 22784844.7.
Engelberg J et al: "Title Near-IR wide field-of-view Huygens metalens for outdoor imaging applications"; Jan. 22, 2019; pp. 1-21.

* cited by examiner

CAMERA COMPRISING META LENS AND WEARABLE ELECTRONIC DEVICE COMPRISING SAME CAMERA

CROSS-REFERENCE TO RELATED APPLICATIONS

This application is a continuation of International Application No. PCT/KR2022/004472, filed on Mar. 30, 2022, designating the United States, in the Korean Intellectual Property Receiving Office, and claiming priority to KR 10-2021-0044911 filed on Apr. 7, 2021, the disclosures of which are all hereby incorporated by reference herein in their entireties.

BACKGROUND

Field

Various example embodiments relate to a camera including a meta-lens and/or a wearable electronic device including the camera.

Description of Related Art

Recently, wearable electronic devices wearable on users' bodies have been widely used. For example, the wearable electronic devices may include a device that can be worn on a user's head, such as augmented reality glasses (AR glasses). The wearable electronic device wearable on the user's head may include components for providing contents to the user and electrical components for driving the components.

For example, the wearable electronic device may include a plurality of cameras, and the cameras may collect external images or may collect images of planes corresponding to the user's eyes.

SUMMARY

In a case of a camera including an optical lens, due to physical characteristics of the optical lens, it may be difficult to make the camera compact. The camera may be a component disposed in the housing of the electronic device.

In the wearable electronic device that can be worn on the user's head, the region within the housing may be limited. When the region within the housing of the wearable electronic device is limited, a mounting region for the camera may be insufficient. When the mounting region for the camera included in the wearable electronic device is not secured, there may be a limitation in the shape of the wearable electronic device, and the comfort that the user experiences when wearing the wearable electronic device may be deteriorated.

Various example embodiments may provide a compact camera including a meta-lens.

Furthermore, various example embodiments may provide an electronic device having an increased degree of freedom for a mounting region of a camera.

In addition, various example embodiments may provide a compact electronic device having an improved wearing comfort.

A wearable electronic device according to an example embodiment may include a frame, a first temple connected, directly or indirectly, to one side of the frame, a second temple connected, directly or indirectly, to an opposite side of the frame, and a camera located in one region of the frame. The camera may include a lens module including at least one meta-lens in which nanostructures are arranged in two dimensions and an image sensor that detects light guided by the lens module.

A camera according to an example embodiment may include a lens module including at least one meta-lens in which nanostructures are arranged in two dimensions, an image sensor that detects light guided by the lens module, and a bonding member that bonds a light exit plane of the lens module and the image sensor. The image sensor may include a light receiving region that converts received light into an electrical signal and a peripheral region located around the light receiving region. One surface of the bonding member is in contact with one region of the lens module, and another surface of the bonding member is in contact with the peripheral region of the image sensor.

According to the various example embodiments, the camera included in the wearable electronic device may include the meta-lens. Accordingly, the camera may be made compact, and/or the degree of freedom for the mounting region of the electronic device may be increased.

Furthermore, according to the various example embodiments, the electronic device may be made compact and/or may have an improved wearing comfort.

In addition, the disclosure may provide various effects that are directly or indirectly recognized.

BRIEF DESCRIPTION OF DRAWINGS

The above and other aspects, features, and advantages of certain example embodiments will be more apparent from the following detailed description, taken in conjunction with the accompanying drawings, in which.

In the following description made with respect to the accompanying drawings, identical or similar components will be assigned with identical or similar reference numerals.

DETAILED DESCRIPTION

Hereinafter, various example embodiments will be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
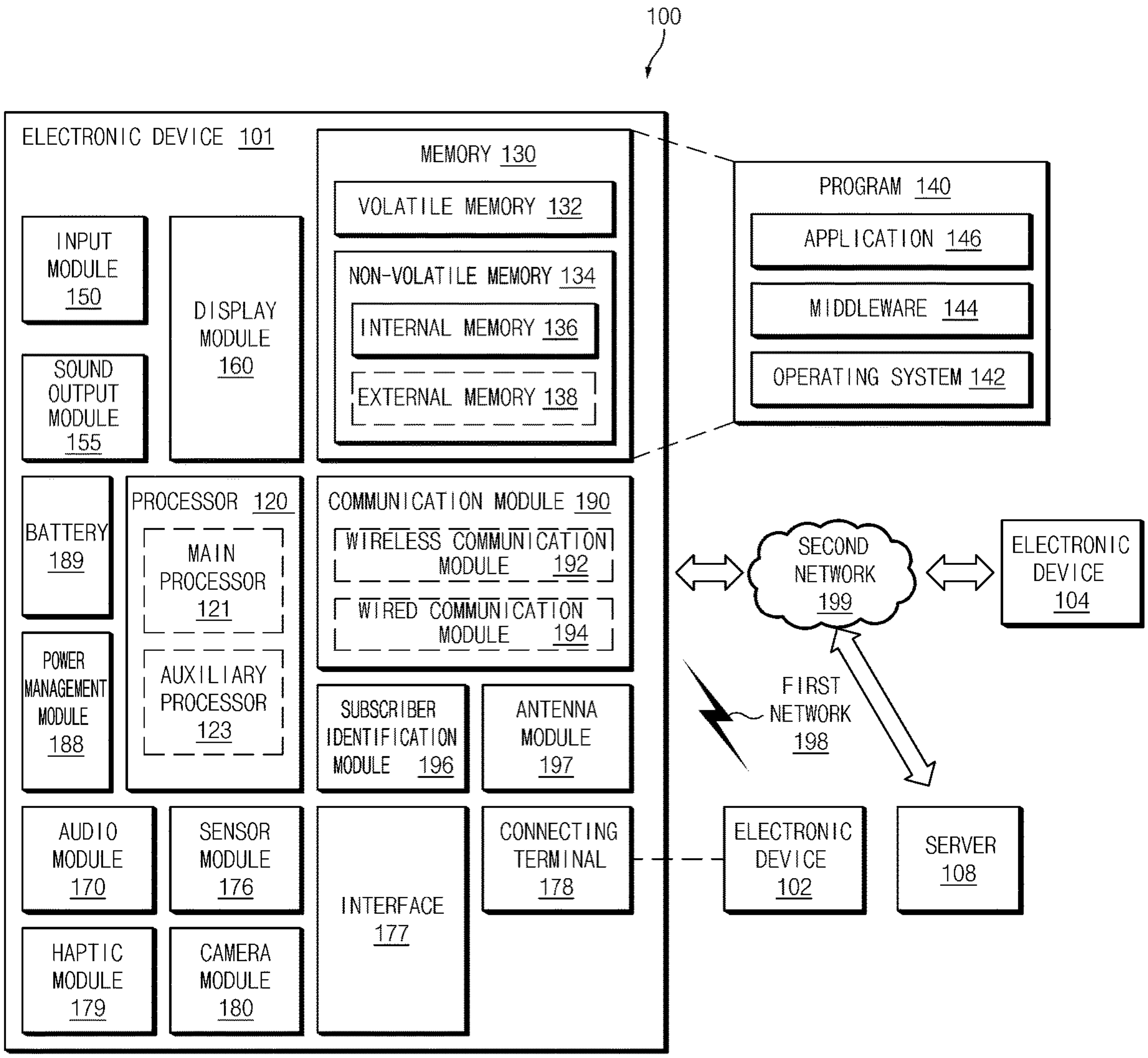
FIG. 1 is a block diagram illustrating an electronic device 101 in a network environment 100 according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
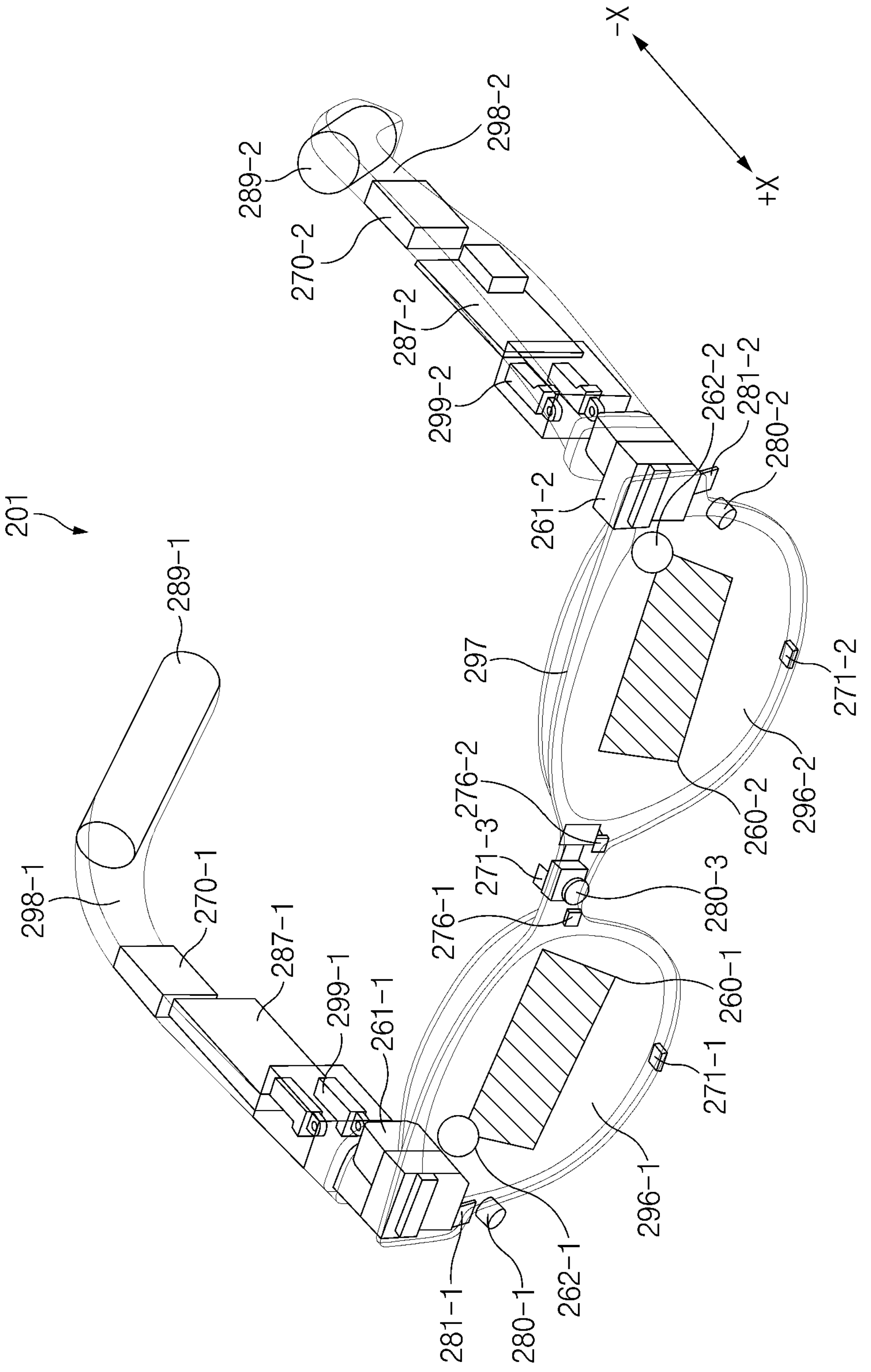
FIG. 2 is a schematic view of a wearable electronic device according to an example embodiment.

FIG. 2 is a schematic view of a wearable electronic device 201 according to an embodiment.

Referring to FIG. 2, in the example of FIG. 2, the wearable electronic device 201 may be referred to as a head mounted display (HMD) device, smart glasses, or eyewear. The form of the wearable electronic device 201 illustrated in FIG. 2 is illustrative, and example embodiments are not limited thereto. For example, the wearable electronic device 201 may be an electronic device configured to provide augmented reality (AR) or virtual reality (VR).

According to an embodiment, the wearable electronic device 201 may include at least some of the components of the electronic device 101 of FIG. 1. For example, the wearable electronic device 201 may include at least one of a display (e.g., the display module 160 of FIG. 1 comprising a display), a camera (e.g., the camera module 180 of FIG. 1 comprising a lens and/or circuitry), at least one sensor (e.g., the sensor module 176 of FIG. 1 comprising a sensor), a processor (e.g., the processor 120 of FIG. 1), a battery (e.g., the battery 189 of FIG. 1), a memory (e.g., 130 of FIG. 1), or communication circuitry (e.g., the communication module 190 of FIG. 1 comprising processing circuitry). At least some of the components of the wearable electronic device 201 may be located inside a housing of the wearable electronic device 201, or may be exposed outside the housing.

The wearable electronic device 201 may include the display. For example, the wearable electronic device 201 may include a first display 261-1 and/or a second display 261-2. The first display 261-1 and/or the second display 261-2 may include at least one of a liquid crystal display (LCD), a digital mirror device (DMD), a liquid crystal on silicon device (LCoS device), an organic light emitting diode (OLED), or a micro light emitting diode (micro LED). For example, the display of the wearable electronic device 201 may include at least one light source for emitting light. When the first display 261-1 and/or the second display 261-2 includes a liquid crystal display device, a digital mirror device, or a silicon liquid crystal display device, the wearable electronic device 201 may include at least one light source that emits light to a screen output region 260-1 and/or 260-2 of the display. In another example, when the display of the wearable electronic device 201 generates light by itself, the display may not include a separate light source other than the light source included in the display. When the first display 261-1 and/or the second display 261-2 includes at least one of an organic light emitting diode or a micro LED, the wearable electronic device 201 may provide an image to a user even without including a separate light source. When the display is implemented with an organic light emitting diode or a micro LED, the weight of the wearable electronic device 201 may be decreased through omission of a separate light source.

According to an embodiment, the wearable electronic device 201 may include a first transparent member 296-1 and/or a second transparent member 296-2. For example, when the user wears the wearable electronic device 201, the user may see through the first transparent member 296-1 and/or the second transparent member 296-2. The first transparent member 296-1 and/or the second transparent member 296-2 may be formed of at least one of a glass plate, a plastic plate, or a polymer and may be transparent or translucent. For example, when the wearable electronic device 201 is worn, the first transparent member 296-1 may be disposed to face the user's right eye, and the second transparent member 296-2 may be disposed to face the user's left eye.

According to an embodiment, at least a portion of the first transparent member 296-1 and/or the second transparent member 296-2 may be an optical waveguide. For example, the optical waveguide may transfer an image generated by the display (e.g., the first display 261-1 and/or the second display 261-2) to the user's eyes. The optical waveguide may be formed of glass, plastic, or a polymer. For example, the optical waveguide may include a nano-pattern (e.g., a grating structure having a polygonal or curved shape) that is formed therein or on one surface thereof. For example, light incident to one end of the optical waveguide may be propagated in the optical waveguide by the nano-pattern and may be provided to the user's eyes. For example, an optical waveguide implemented with a free-form prism may be configured to provide incident light to the user through a reflective mirror.

According to an embodiment, the optical waveguide may include at least one of at least one diffractive element (e.g., a diffractive optical element (DOE) or a holographic optical element (HOE)) or a reflective element (e.g., a reflective mirror). The optical waveguide may guide display light emitted from a light source to the user's eyes using the at least one diffractive element or the reflective element included in the optical waveguide. For example, the diffractive element may include an input optical member (e.g., 262-1 and/or 262-2) and/or an output optical member (not illustrated). The first input optical member 262-1 and/or the second input optical member 262-2 may be referred to as an input grating area, and the output optical member (not illustrated) may be referred to as an output grating area. To deliver light output from a light source (e.g., a micro LED) to a transparent member (e.g., the first transparent member 296-1 and/or the second transparent member 296-2) of a screen display part, the input grating area may diffract or reflect the light. The output grating area may diffract or reflect the light delivered to the transparent member (e.g., the first transparent member 296-1 and/or the second transparent member 296-2) of the optical waveguide toward the user's eyes. For example, the reflective element may include a total reflection optical element or a total reflection waveguide for total internal reflection (TIR). The total internal reflection may be referred to as one way of guiding light and may indicate delivering 100% of light (e.g., an image) input through the input grating area to the output grating area by making an incidence angle such that 100% of the light is reflected by one surface (e.g., a specific surface) of the optical waveguide. In an embodiment, the optical path of light emitted from the display may be guided to the optical waveguide by the input optical member. Light travelling inside the optical waveguide may be guided toward the user's eyes through the output optical member. The screen output region 260-1 and/or 260-2 may be determined based on the light emitted toward the eyes.

In FIG. 2, the wearable electronic device 201 has been described as providing an image to the user using the optical waveguide. However, example embodiments are not limited thereto. According to an embodiment, the display of the wearable electronic device 201 may be a transparent or translucent display. In this case, the display may be disposed in a position (e.g., the first screen output region 260-1 and/or the second screen output region 260-2) that faces the user's eyes.

According to an embodiment, the wearable electronic device 201 may include at least one camera. For example, the wearable electronic device 201 may include a first camera 280-1, a second camera 280-2, and/or a third camera 280-3. For example, the first camera 280-1 and the second camera 280-2 may be used to recognize an external image. The first camera 280-1 and the second camera 280-2 may be configured to obtain an image corresponding to a direction (e.g., the +x direction) that corresponds to the user's gaze. The wearable electronic device 201 may perform head tracking (e.g., three or six degrees of freedom (DOF) tracking), hand image detection, hand image tracking, and/or space recognition using the first camera 280-1 and the second camera 280-2. For example, the first camera 280-1 and the second camera 280-2 may be global shutter (GS) cameras having the same standard and performance (e.g., angle of view, shutter speed, resolution, and/or the number of color bits). The wearable electronic device 201 may support simultaneous localization and mapping (SLAM) technology by performing space recognition (e.g., 6-DOF space recognition) and/or depth information acquisition using stereo cameras disposed on the left/right sides thereof. In addition, the wearable electronic device 201 may recognize the user's gesture using the stereo cameras disposed on the left/right sides thereof. The wearable electronic device 201 may detect faster hand gestures and fine movements by using the GS cameras having less distortion than rolling shutter (RS) cameras. For example, the third camera 280-3 may be used to recognize an external image. The third camera 280-3 may be configured to obtain an image corresponding to the direction (e.g., the +x direction) that corresponds to the user's gaze. In an embodiment, the third camera 280-3 may be a camera having a higher resolution than the first camera 280-1 and the second camera 280-2. The third camera 280-3 may be referred to as a high resolution (HR) camera or a photo video (PV) camera. The third camera 280-3 may support functions for obtaining a high-quality image, such as auto focus (AF) and/or optical image stabilization (OIS). The third camera 280-3 may be a GS cameras or an RS camera.

According to an embodiment, the wearable electronic device 201 may include at least one eye-tracking sensor. For example, the wearable electronic device 201 may include a first eye-tracking sensor 276-1 and a second eye-tracking sensor 276-2. The first eye-tracking sensor 276-1 and the second eye-tracking sensor 276-2 may be, for example, cameras configured to obtain an image in a direction corresponding to the user's eyes. The first eye-tracking sensor 276-1 and the second eye-tracking sensor 276-2 may be configured to obtain an image of the user's right eye and an image of the user's left eye. The wearable electronic device 201 may be configured to detect the user's pupils using the first eye-tracking sensor 276-1 and the second eye-tracking sensor 276-2. The wearable electronic device 201 may obtain the user's gaze from images of the user's pupils and may provide an image, based on the obtained gaze. For example, the wearable electronic device 201 may display the image such that the image is located in the user's gaze direction. For example, the first eye-tracking sensor 276-1 and the second eye-tracking sensor 276-2 may be global shutter (GS) cameras having the same standard and performance (e.g., angle of view, shutter speed, resolution, and/or the number of color bits).

According to an embodiment, the wearable electronic device 201 may include at least one illumination unit. The illumination unit may include, for example, at least one LED. In FIG. 2, the wearable electronic device 201 may include a first illumination unit 281-1 and a second illumination unit 281-2. For example, the wearable electronic device 201 may provide auxiliary lighting for the first camera 280-1, the second camera 280-2, and/or the third camera 280-3 by using the first illumination unit 281-1 and the second illumination unit 281-2. In an embodiment, the wearable electronic device 201 may provide lighting for acquisition of a pupil image by using an illumination unit (not illustrated). For example, the wearable electronic device 201 may provide lighting for the eye-tracking sensor by using an LED emitting light in the infrared band. In this case, the eye-tracking sensor may include an image sensor for obtaining an infrared wavelength image.

According to an embodiment, the wearable electronic device 201 may include at least one printed circuit board (PCB). For example, the wearable electronic device 201 may include a first PCB 287-1 located in a first temple 298-1 and a second PCB 287-2 located in a second temple 298-2. The first PCB 287-1 and/or the second PCB 287-2 may be electrically connected, directly or indirectly, with other components of the wearable electronic device 201 through a signal line and/or a flexible PCB (FPCB). For example, the communication circuitry, the memory, the at least one sensor, and/or the processor may be disposed on the first PCB 287-1 and/or the second PCB 287-2. For example, each of the first PCB 287-1 and the second PCB 287-2 may be implemented with a plurality of PCBs spaced apart from each other by an interposer.

According to an embodiment, the wearable electronic device 201 may include at least one battery. For example, the wearable electronic device 201 may include a first battery 289-1 located in one end of the first temple 298-1 and a second battery 289-2 located in one end of the second temple 298-2. The first battery 289-1 and the second battery 289-2 may be configured to supply power to components of the wearable electronic device 201.

According to an embodiment, the wearable electronic device 201 may include at least one speaker. For example, the wearable electronic device 201 may include a first speaker 270-1 and a second speaker 270-2. The wearable electronic device 201 may be configured to provide stereo sounds using the speakers located on the left and right sides thereof.

According to an embodiment, the wearable electronic device 201 may include at least one microphone. For example, the wearable electronic device 201 may include a first microphone 271-1, a second microphone 271-2, and/or a third microphone 271-3. The first microphone 271-1 may be located on, directly or indirectly, the right side of a frame 297, the second microphone 271-2 may be located on, directly or indirectly, the left side of the frame 297, and the third microphone 271-3 may be located on, directly or indirectly, a bridge of the frame 297. In an embodiment, the wearable electronic device 201 may perform beamforming using the first microphone 271-1, the second microphone 271-2, and/or the third microphone 271-3.

According to an embodiment, the wearable electronic device 201 may include the first temple 298-1, the second temple 298-2, and the frame 297. The first temple 298-1, the second temple 298-2, and the frame 297 may be referred to as the housing. The first temple 298-1 may be physically connected to the frame 297 through a first hinge 299-1 and may support the frame 297 when worn. The second temple 298-2 may be physically connected to the frame 297 through a second hinge 299-2 and may support the frame 297 when worn.

The above-described configuration of the wearable electronic device 201 is illustrative, and example embodiments are not limited thereto. For example, the wearable electronic device 201 may not include at least some of the components described in relation to FIG. 2, or may further include components other than the above-described components. For example, the wearable electronic device 201 may include at least one sensor (e.g., an acceleration sensor, a gyro sensor, and/or a touch sensor) and/or an antenna.

Figure 3:
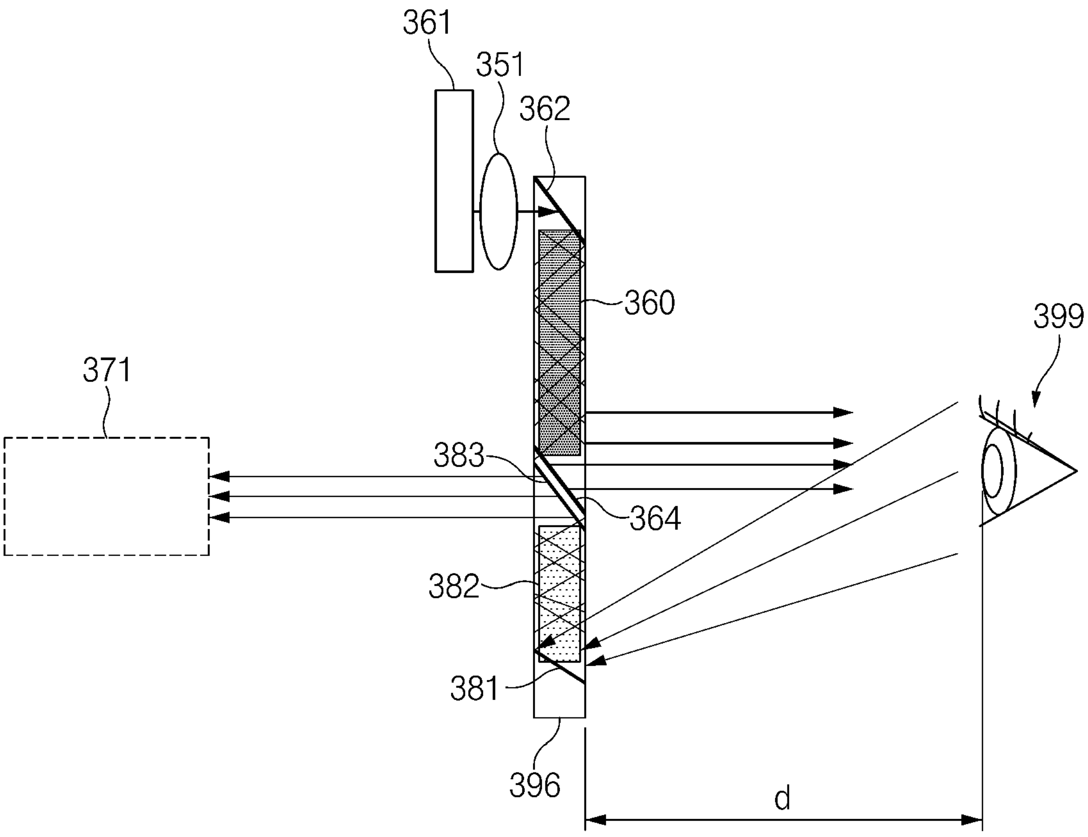
FIG. 3 is a schematic view illustrating an eye-tracking and display method through a transparent member according to an example embodiment.

FIG. 3 is a schematic view illustrating an eye-tracking and display method through a transparent member according to an embodiment.

Referring to FIG. 3, a display 361 (e.g., the first display 261-1 or the second display 261-2 of FIG. 2) may provide an image through the transparent member 396 (e.g., the first transparent member 296-1 or the second transparent member 296-2 of FIG. 2). According to an embodiment, the display 361 may input light corresponding to the image to an input optical member 362 (e.g., the first input optical member 262-1 or the second input optical member 262-2 of FIG. 2) through a lens 351. The input optical member 362 may reflect or diffract the incident light and may input the light to an optical waveguide 360. An output optical member 364 may output the light delivered through the optical waveguide 360 toward an eye 399 of a user. In an embodiment, the lens 351 may be included in the display 361. In an embodiment, the position of the lens 351 may be determined based on the distance between the transparent member 396 and the eye 399 of the user.

An eye-tracking sensor 371 (e.g., the first eye-tracking sensor 276-1 or the second eye-tracking sensor 276-2 of FIG. 2) may obtain an image corresponding to at least a portion of the eye 399 of the user. For example, light corresponding to an image of the eye 399 of the user may be reflected and/or diffracted through a first splitter 381 and may be input to an optical waveguide 382. The light delivered to a second splitter 383 through the optical waveguide 382 may be reflected and/or diffracted by the second splitter 383 and may be output toward the eye-tracking sensor 371.

Figure 4:
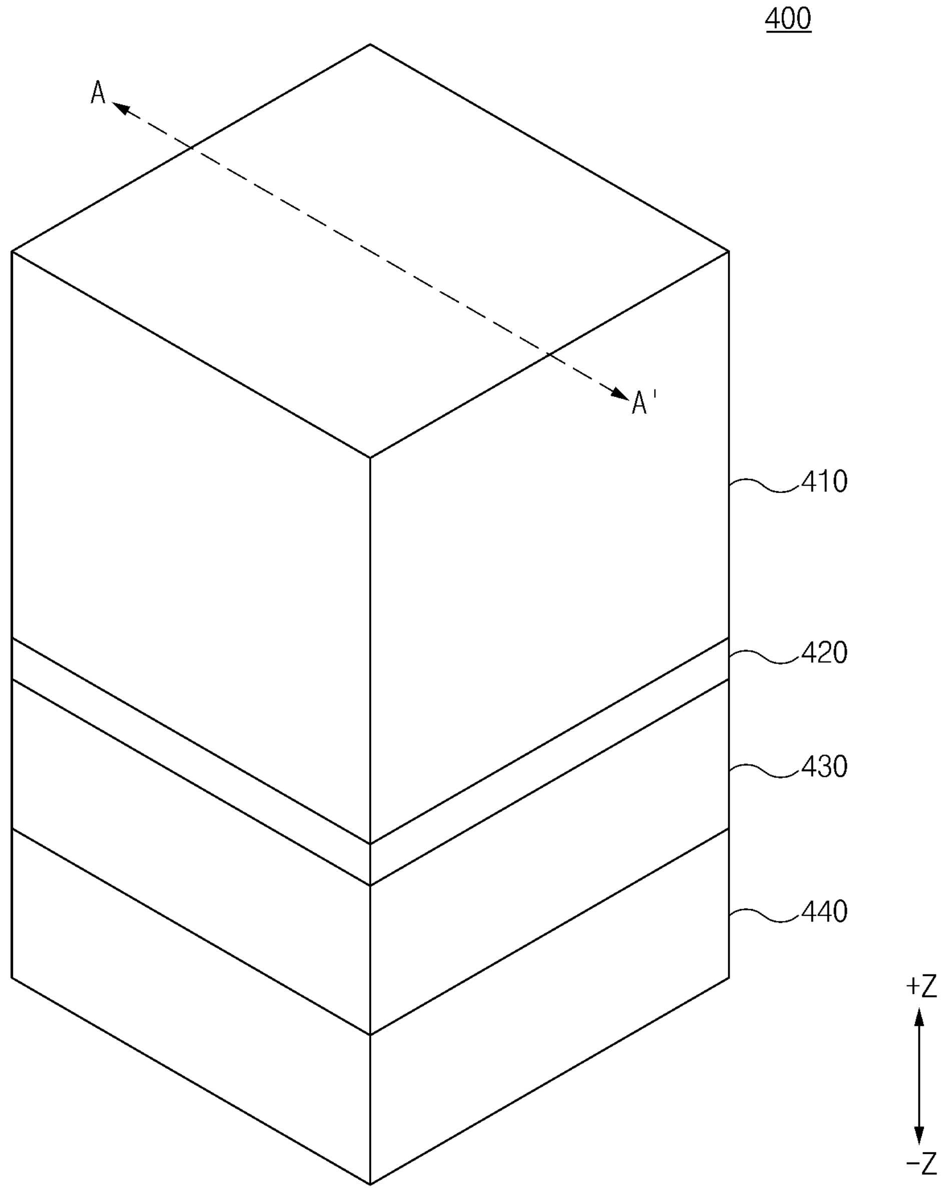
FIG. 4 is a schematic view illustrating a camera according to an example embodiment.

Hereinafter, a camera 400 according to an embodiment will be described with reference to FIG. 4. FIG. 4 is a schematic view illustrating the camera 400 according to an embodiment. The camera 400 of FIG. 4 may be a camera (e.g., the first camera 280-1, the second camera 280-2, or the third camera 280-3 of FIG. 2) or an eye-tracking sensor (e.g., the first eye-tracking sensor 276-1 or the second eye-tracking sensor 276-2 of FIG. 2, or the eye-tracking sensor 371 of FIG. 3) included in a wearable electronic device (e.g., the wearable electronic device 201 of FIG. 2).

According to an embodiment, the camera 400 may be located in the frame of the wearable electronic device 201 (e.g., the frame 297 of FIG. 2). The position in which the camera 400 is disposed in the wearable electronic device 201 may vary depending on an object being sensed by the camera 400 and sensing performance thereof. When the object being sensed by the camera 400 is an external image corresponding to a user's gaze, the camera 400 may be located in an end piece or the bridge of the frame 297. In contrast, when the object being sensed by the camera 400 is an image (e.g., an image of a pupil) in a direction corresponding to the user's eyes, the camera 400 may be located in a rim of the frame 297. In addition, the position of the camera 400 in the frame 297 may be determined depending on the angle of view, the shutter speed, the resolution, and the sensing wavelength of the camera 400.

In an embodiment, the camera 400 located in one region of the frame 297 may include a lens module 410 comprising a lens, a bonding member 420 comprising bonding material, an image sensor 430, and a circuit board 440. The lens module 410 may guide light to the image sensor 430. The lens module 410 may include a meta-lens in which nanostructures are arranged in two dimensions. The meta-lens may include a plurality of nanostructures.

The nanostructures included in the meta-lens may guide incident light incident to the lens module 410 to any focus depending on an arrangement shape of the nanostructures. Here, the term "arrangement shape" may mean at least one of the size, shape, and spacing of the nanostructures, and size distribution, shape distribution, and spacing distribution by position of the nanostructures with respect to the region where the meta-lens is located. A detailed arrangement shape of the nanostructures included in the meta-lens may vary depending on optical performance required for the meta-lens. For example, the arrangement shape of the nanostructures may vary depending on the wavelength band of light to be collected through the meta-lens, the back focus length, and the like.

In an embodiment, the lens module 410 may include not only the meta-lens but also at least one of a substrate made of glass, quartz, a polymer, plastic, or a silicon wafer, a protective layer for securing the physical hardness of the lens module 410, a light blocking film for blocking light from entering a surface other than a light incident plane, or an optical filter for selectively passing light in a preset wavelength band.

In an embodiment, the bonding member 420 may bond the lens module 410 and the image sensor 430. The bonding between the lens module 410 and the image sensor 430 may include both physical bonding and chemical bonding. For example, the lens module 410 and the image sensor 430 may be bonded by a wafer bonding method. The bonding member 420 may include an adhesive layer in a liquid or film form.

In an embodiment, the back focus length BFL between the lens module 410 and the image sensor 430 may be adjusted based on the height of the bonding member 420. The lens module 410 and the image sensor 430 may be spaced apart from each other at a certain interval by the bonding member 420. The bonding member 420 may be formed in consideration of the thickness of the lens module 410. The bonding member 420 may bond the image sensor 430 and a lower surface (e.g., a surface in the −Z-axis direction) of the lens module 410.

In an embodiment, the image sensor 430 may detect a signal corresponding to light guided through the lens module 410 and may transmit the detected signal to the circuit board 440.

In an embodiment, the circuit board 440 may process the signal received from the image sensor 430. In this case, the processing of the signal may include amplification and computation of the signal and removal of noise.

Figure 5:
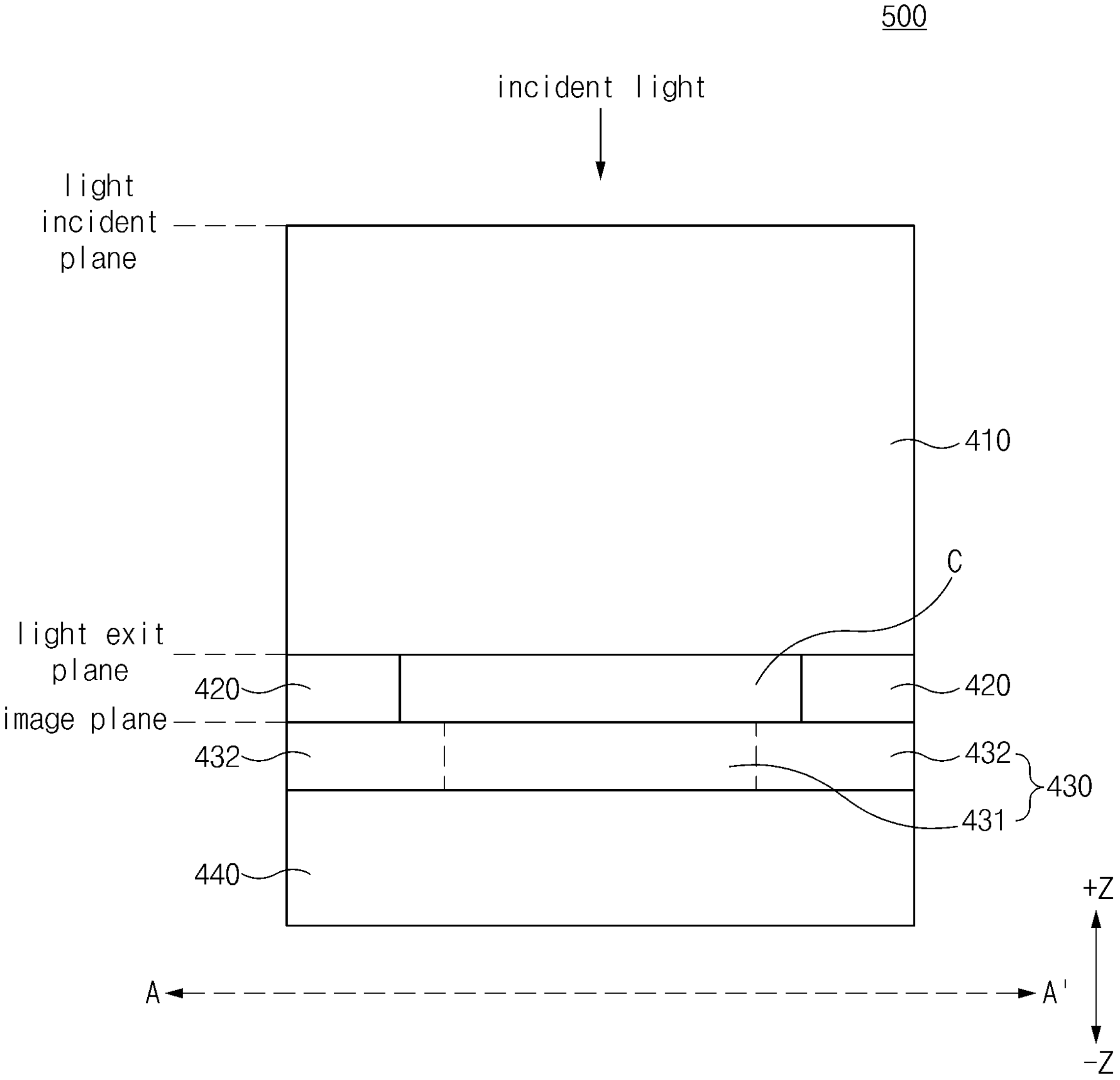
FIG. 5 is a sectional view of a camera taken along a first cutting line of FIG. 4.

Hereinafter, a camera 500 according to an embodiment will be described with reference to FIG. 5. FIG. 5 is a sectional view of the camera 500 taken along a first cutting line A-A' of FIG. 4 according to an embodiment.

A relationship between a lens module 410, a bonding member 420, an image sensor 430, and a circuit board 440 included in the camera 500 is illustrated in FIG. 5. Hereinafter, when components overlap each other, this may indicate that the components are superimposed on each other in one direction (e.g., a thickness direction).

In an embodiment, the lens module 410 may be disposed to overlap the image sensor 430. As the lens module 410 overlaps the image sensor 430, incident light incident through a light incident plane of the lens module 410 may be refracted through the lens module 410 and may be guided to the image sensor 430.

In an embodiment, the lens module 410 may include a plurality of meta-lenses having positive refractive power or negative refractive power. The refractive index of each of the meta-lenses may be adjusted by varying an arrangement shape of nanostructures included in the meta-lens and a material constituting the nanostructures.

In an embodiment, the back focus length of the lens module 410 may be adjusted by adjusting the distance between the meta-lenses included in the lens module 410. For example, the lens module 410 may guide light such that the light is focused on the image sensor 430 overlapping the lens module 410.

The lens module 410 may include the plurality of meta-lenses and substrate layers located under the meta-lenses (e.g., in the −Z-axis direction), respectively. In other words, the lens module 410 may include a plurality of layers.

In an embodiment, the bonding member 420 may bond a light exit plane of the lens module 410 and the image sensor 430. A cavity C may be formed between at least the light exit plane of the lens module 410, the image sensor 430, and the bonding member 420. The cavity C may be an air or vacuum cavity.

In an embodiment, the bonding member 420 may include an adhesive layer in a liquid or film form that has a certain viscosity. The adhesive layer in the liquid form may be applied to an upper surface (e.g., a surface in the +Z-axis direction) of the image sensor 430 or a lower surface (e.g., a surface in the −Z-axis direction or the light exit plane) of the lens module 410. When the bonding member 420 includes the adhesive layer in the film form, the thickness of the bonding member 420 may be adjusted through lamination.

In an embodiment, the bonding member 420 may be selectively formed on a partial region of the upper surface (e.g., the surface in the +Z-axis direction) of the image sensor 430 or the lower surface (e.g., the surface in the −Z-axis direction or the light exit plane) of the lens module 410. The bonding member 420 may be adjacent to a side surface (e.g., a surface other than the light incident plane and the light exit plane) of the lens module 410 and may be formed in contact with the light exit plane of the lens module 410.

In an embodiment, the thickness of the bonding member 420 may be adjusted such that light guided by the lens module 410 is focused on one surface of the image sensor 430. For example, the thickness of the bonding member 420 may be in agreement with the back focus length BFL of the lens module 410. For example, the back focus length BFL may range from 0.02 mm to 0.05 mm.

In an embodiment, the image sensor 430 may include a light receiving region 431 (e.g., a pixel array) that converts received light into an electrical signal and a peripheral region 432 located around the light receiving region 431.

In an embodiment, the light receiving region 431 may include elements that convert received light into an electrical signal corresponding to the light. For example, the light receiving region 431 may include a CCD, a CMOS image sensor, a photodiode, and the like. The light receiving region 431 may be disposed on an image plane on which an optical image of light guided by the lens module 410 is formed.

The lens module 410 may adjust the path of the incident light such that an optical image is formed on the light receiving region 431. The refractive powers of the meta-lenses included in the lens module 410, the distance between at least the lenses, and the arrangement shape of the nanostructures included in the meta-lenses may be adjusted such that the optical image is formed on the light receiving region 431.

In an embodiment, the image sensor 430 may include an image processing circuit (not illustrated) that is electrically connected, directly or indirectly, with the light receiving region 431. For example, the image processing circuit may be located in at least one area of the peripheral region 432. The image processing circuit may include elements that perform processing or computation on an electrical signal generated from the light receiving region 431. For example, the image processing circuit may include a correlated double sampler that samples and holds a signal provided from the light receiving region 431 and doubly samples a specific noise level and a signal level by the incident light and an analog-to-digital converter that converts an analog signal received from the correlated double sampler into a digital signal.

Furthermore, the image processing circuit may include an output buffer that latches received digital signals and sequentially outputs the latched signals to a processor (e.g., the processor 120 of FIG. 1), a row driver that generates a signal for selecting and/or driving the plurality of elements included in the light receiving region 431, and a column driver that causes the light receiving region 431 to absorb light, accumulate charges, temporarily store the accumulated charges, and output an electrical signal depending on the stored charges to the outside of the light receiving region 431.

In addition, the image processing circuit may include a timing controller that generates signals for selecting and/or controlling the analog-to-digital converter, the output buffer, the row driver, and the column driver. The components of the image processing circuit are illustrative, and example embodiments are not limited thereto.

In an embodiment, the bonding member 420 may overlap the peripheral region 432 included in the image sensor 430. The peripheral region 432 may not include an element that converts light into an electrical signal. Accordingly, even though the bonding member 420 overlaps the peripheral region 432, the bonding member 420 may not affect a signal detected by the image sensor 430.

In an embodiment, the bonding member 420 may be formed so as not to overlap the light receiving region 431 included in the image sensor 430. One surface of the bonding member 420 may be in contact with one region of the lens module 410, and another surface of the bonding member 420 may be in contact with the peripheral region 432 of the image sensor 430. Depending on the position in which the bonding member 420 is formed, the cavity C may be formed between at least the light receiving region 431 and the lens module 410. Light passing through the light exit plane may reach the light receiving region 431 without passing through a layer other than the cavity C. Accordingly, optical path distortion between the light passing through the light exit plane and the light received by the light receiving region 431 may be minimized.

In an embodiment, the image sensor 430 may include a sensor substrate (not illustrated) on which the light receiving region 431 and the image processing circuit are provided. The sensor substrate may be, for example, a semiconductor substrate. However, this is illustrative, and example embodiments are not limited thereto.

In an embodiment, the camera 500 may include the circuit board 440 disposed under the image sensor 430. For example, the circuit board 440 may be a printed circuit board. The circuit board 440 may include a conductive pattern, and the conductive pattern may be electrically connected, directly or indirectly, with the image sensor 430. The conductive pattern may include a connection unit for electrical connection with an external device. The connection unit may include, for example, a solder ball, a bump, a pad, or the like. The conductive pattern may include, for example, copper (Cu) or gold (Au).

In an embodiment, some of the elements included in the above-described image processing circuit may be included in the circuit board 440. For example, the circuit board 440 may include at least one of the correlated double sampler, the analog-to-digital converter, the output buffer, the row driver, the column driver, or the timing controller. The arrangement structure of the elements included in the image sensor 430 or the circuit board 440 may vary depending on the layout of the image sensor 430 and the circuit board 440.

Figure 6:
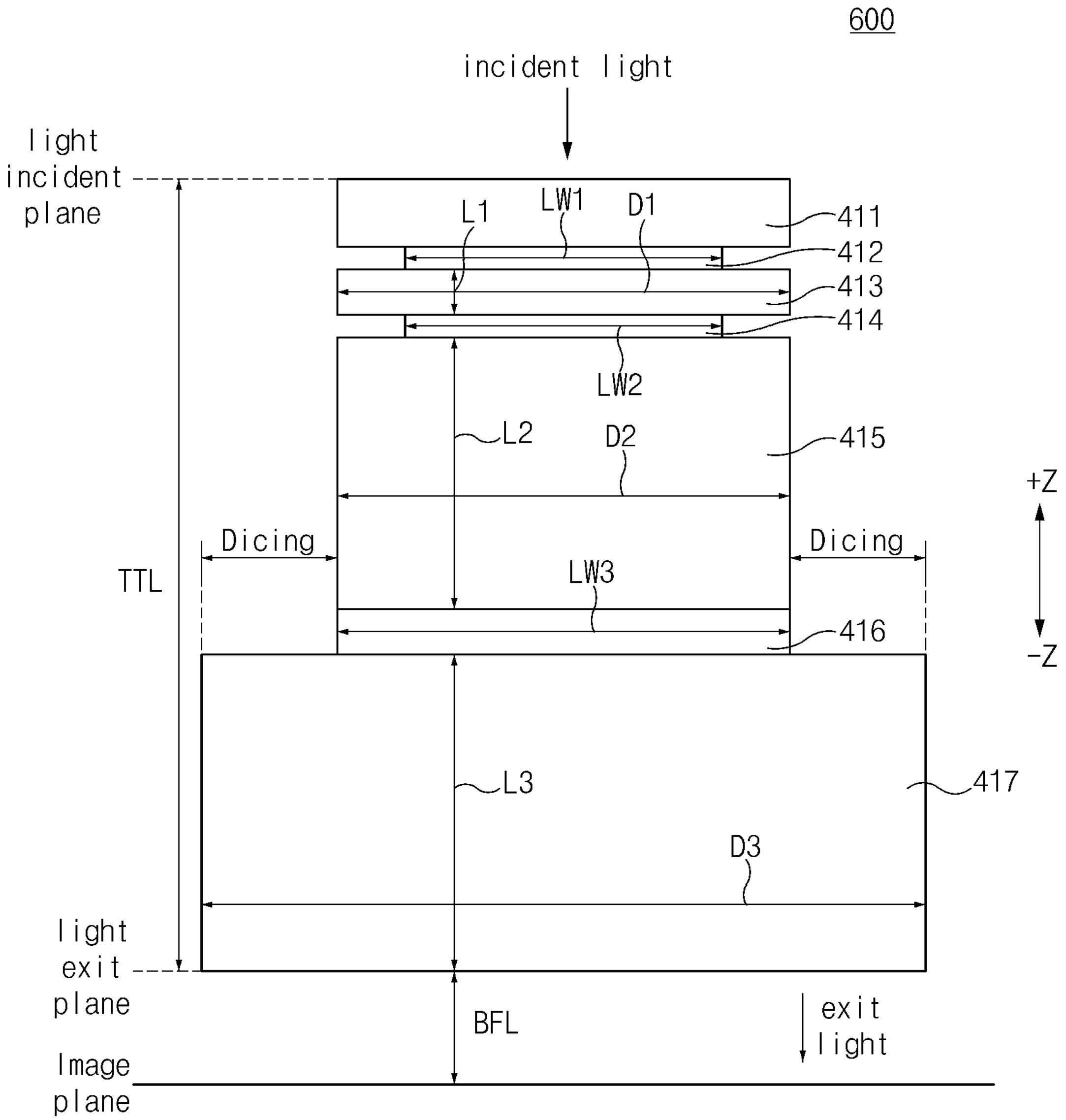
FIG. 6 is a sectional view illustrating some components included in a camera according to an example embodiment.

FIG. 6 is a sectional view illustrating some components included in a camera (e.g., 400 of FIG. 4) according to an embodiment. Hereinafter, a lens module 600 included in the camera (e.g., 400 of FIG. 4) according to an embodiment will be described with reference to FIG. 6.

Referring to FIG. 6, the lens module 600 according to an embodiment may receive incident light through a light incident plane.

In an embodiment, the lens module 600 may include a protective layer 411 disposed on the light incident plane, a first meta-lens 412 disposed on a light incident plane side, a first substrate 413 in contact with the bottom of the first meta-lens 412, a second meta-lens 414 in contact with the bottom of the first substrate 413, a second substrate 415 in contact with the bottom of the second meta-lens 414, a third meta-lens 416 in contact with the bottom of the second substrate 415, and a third substrate 417 in contact with the bottom of the third meta-lens 416.

In an embodiment, the lens module 600 may include a plurality of meta-lenses (e.g., the first meta-lens 412, the second meta-lens 414, and the third meta-lens 416) and a plurality of substrates (e.g., the first substrate 413, the second substrate 415, and the third substrate 417) disposed on the lower surfaces (e.g., surfaces in the −Z-axis direction) of the meta-lenses 412, 414, and 416. The lens module 600 including the three meta-lenses 412, 414, and 416 and the three substrates 413, 415, and 417 is illustrated in FIG. 6. However, this is illustrative, and example embodiments are not limited thereto.

The lens module 600 may include one or more meta-lenses having positive refractive power and one or more meta-lenses having negative refractive power in consideration of performance such as angle of view, F-number, magnification, and back focus length.

In an embodiment, the protective layer 411 may be located on the light incident plane of the lens module 600. One surface (e.g., a surface in the +Z-axis direction) of the protective layer 411 may be in agreement with the light incident plane. Another surface (e.g., a surface in the −Z-axis direction) of the protective layer 411 may be in contact with the first meta-lens 412. The protective layer 411 may be formed of a light transmitting material. For example, the protective layer 411 may be formed of glass, quartz, a polymer, plastic, or a silicon wafer. The protective layer 411 may be formed of the same material as that of the first substrate 413, the second substrate 415, or the third substrate 417.

In an embodiment, the plurality of substrates (e.g., the first substrate 413, the second substrate 415, and the third substrate 417) disposed on the lower surfaces (e.g., the surfaces in the −Z-axis direction) of the meta-lenses 412, 414, and 416, respectively, may be formed of a material having a refractive index different from that of nanostructures included in each of the meta-lenses 412, 414, and 416. For example, the difference between the refractive index of the plurality of substrates (e.g., the first substrate 413, the second substrate 415, and the third substrate 417) and the refractive index of the nanostructures may be greater than or equal to 0.5. The plurality of substrates (e.g., the first substrate 413, the second substrate 415, and the third substrate 417) may be formed of a material having a refractive index higher than the refractive index of the nanostructures. However, without being limited thereto, the plurality of substrates (e.g., the first substrate 413, the second substrate 415, and the third substrate 417) may have a lower refractive index than the nanostructures.

In an embodiment, the protective layer 411 may be formed of a material having a refractive index different from the refractive index of the nanostructures included in the first to third meta-lenses 412, 414, and 416. For example, the difference between the refractive index of the protective layer 411 and the refractive index of the nanostructures may be greater than or equal to 0.5. The protective layer 411 may be formed of a material having a refractive index higher than the refractive index of the nanostructures. However, without being limited thereto, the protective layer 411 may have a lower refractive index than the nanostructures. In some embodiments, the protective layer 411 may be omitted.

In an embodiment, as the protective layer 411 is provided, physical characteristics of the lens module 600 may be improved. The physical characteristics of the lens module 600 may include the hardness of the lens module 600. In addition, the protective layer 411 may prevent or reduce damage to a meta-lens (e.g., the first meta-lens 412) located under the protective layer 411. For example, the protective layer 411 may have a thickness of 0.01 mm to 0.2 mm.

In an embodiment, the first meta-lens 412 may be disposed on the light incident plane side of the lens module 600. The first meta-lens 412 may be located on, directly or indirectly, the upper surface (e.g., a surface in the +Z-axis direction) of the first substrate 413 and may be located between at least the protective layer 411 and the first substrate 413.

In an embodiment, the first meta-lens 412 may include a plurality of nanostructures. The arrangement shape of the nanostructures included in the first meta-lens 412 may be determined such that the nanostructures guide the incident light to any focus. Likewise, the second meta-lens 414 and the third meta-lens 416 may also include a plurality of nanostructures that guide the incident light. For example, the nanostructures may include at least one of c-Si, p-Si, a-Si, group III-V compound semiconductor (GaP, GaN, GaAs, or the like), SiC, TiO2, or SiN.

In an embodiment, the first meta-lens 412 may include a spacer layer having a refractive index different from the refractive index of the nanostructures. The spacer layer may secure structural stability of the nanostructures. In addition, the spacer layer may serve as a planarization layer for the protective layer 411. For example, the difference in refractive index between the spacer layer and the nanostructures may be greater than or equal to 0.5. The spacer layer may be formed of a material, such as a polymer material or silicon oxide, which has a low refractive index.

In an embodiment, the first meta-lens 412 may be manufactured according to a semiconductor manufacturing process. For example, the first substrate 413 may be a semiconductor substrate. The first meta-lens 412 may be formed on the first substrate 413. A material layer (e.g., a layer of at least one of c-Si, p-Si, a-Si, group III-V compound semiconductor (GaP, GaN, GaAs, or the like), SiC, TiO2, or SiN) for forming the nanostructures included in the first meta-lens 412 may be stacked on the first substrate 413 and may be subjected to patterning depending on the arrangement shape of the nanostructures. Thereafter, a material for forming the spacer layer may be deposited or coated and may be subjected to planarization, and thus the first meta-lens 412 may be formed on the first substrate 413. In some embodiments, the spacer layer included in the first meta-lens 412 may be formed to overlap the entire upper surface (e.g., the surface in the +Z-axis direction) of the first substrate 413.

In an embodiment, the first substrate 413 located on, directly or indirectly, the lower surface (e.g., the surface in the −Z-axis direction) of the first meta-lens 412 may be formed of glass, quartz, a polymer, plastic, or a silicon wafer.

In an embodiment, the second meta-lens 414 may be in contact with the lower surface (e.g., the surface in the −Z-axis direction) of the first substrate 413. The second meta-lens 414 may be located on, directly or indirectly, the upper surface (e.g., a surface in the +Z-axis direction) of the second substrate 415 and may be located between at least the first substrate 413 and the second substrate 415.

In an embodiment, the second meta-lens 414 may include a plurality of nanostructures. In addition, the second meta-lens may include a spacer layer that serves as a planarization layer for the first substrate 413 and secures structural stability of the nanostructures. The spacer layer may include a polymer material or silicon oxide. In some embodiments, the spacer layer included in the second meta-lens 414 may be formed to overlap the entire upper surface (e.g., the surface in the +Z-axis direction) of the second substrate 415.

In an embodiment, the second meta-lens 414 may be manufactured according to a semiconductor manufacturing process. The nanostructures included in the second meta-lens 414 may include at least one of c-Si, p-Si, a-Si, group III-V compound semiconductor (GaP, GaN, GaAs, or the like), SiC, TiO2, or SiN. In addition, the second substrate 415 located under the second meta-lens 414 may be formed of glass, quartz, a polymer, plastic, or a silicon wafer.

In an embodiment, the third meta-lens 416 may be in contact with the lower surface (e.g., the surface in the −Z-axis direction) of the second substrate 415. The third meta-lens 416 may be located on, directly or indirectly, the upper surface (e.g., a surface in the +Z-axis direction) of the third substrate 417 and may be located between at least the second substrate 415 and the third substrate 417.

In an embodiment, the third meta-lens 416 may include a plurality of nanostructures. In addition, the second meta-lens may include a spacer layer that serves as a planarization layer for the second substrate 415 and secures structural stability of the nanostructures. The spacer layer may include a polymer material or silicon oxide.

In an embodiment, the third meta-lens 416 may be manufactured according to a semiconductor manufacturing process. The nanostructures included in the third meta-lens 416 may include at least one of c-Si, p-Si, a-Si, group III-V compound semiconductor (GaP, GaN, GaAs, or the like), SiC, TiO2, or SiN. In addition, the third substrate 417 located under the third meta-lens 416 may be formed of glass, quartz, a polymer, plastic, or a silicon wafer.

The third substrate 417 may extend from the light incident plane toward a light exit plane. For example, the third substrate 417 may have a thickness L3 of 1 mm or less. The third substrate 417 may be bonded with an image sensor (e.g., 430 of FIG. 4 and/or FIG. 5) disposed on an image plane through a bonding member (e.g., 420 of FIG. 4 and/or FIG. 5).

In a manufacturing process of the lens module 600 according to an embodiment, the first substrate 413 having the first meta-lens 412 formed thereon may be bonded to the second meta-lens 414 formed on the second substrate 415. After the first substrate 413 is bonded to the second meta-lens 414, the protective layer 411 may be coupled, directly or indirectly, to the top of the first meta-lens 412.

Thereafter, the coupled protective layer 411, the first substrate 413, and the second substrate 415 may be diced and then may be bonded to the third meta-lens 416 formed on the top of the third substrate 417. Accordingly, the lens module 600 may be manufactured. Dicing may refer to a process of cutting a mother substrate into a plurality of separate substrates.

In another embodiment, the first meta-lens 412 may be formed on the protective layer 411. A material layer (e.g., a layer of at least one of c-Si, p-Si, a-Si, group III-V compound semiconductor (GaP, GaN, GaAs, or the like), SiC, TiO2, or SiN) for forming the nanostructures included in the first meta-lens 412 may be stacked on the protective layer 411 and may be subjected to patterning depending on the arrangement shape of the nanostructures. Thereafter, a material for forming the spacer layer may be deposited or coated and may be subjected to planarization, and thus the first meta-lens 412 may be formed on the protective layer 411.

In the other embodiment, the second meta-lens 414 may be formed on the first substrate 413, and the third meta-lens 416 may be formed on the second substrate 415. The first meta-lens 412 formed on the protective layer 411, the second meta-lens 414 formed on the first substrate 413, and the third meta-lens 416 formed on the second substrate 415 may be stacked and bonded and may be separated through dicing. Thereafter, the third substrate 417 may be bonded to the third meta-lens 416, and thus the lens module 600 may be manufactured.

The incident light may be guided by the lens module 600 and may be output as exit light. The arrangement shape of the nanostructures included in the first to third meta-lenses 412, 414, and 416 may be adjusted such that the focus of the exit light is formed on the image plane. A light receiving region (e.g., 431 of FIG. 5) included in the image sensor (e.g., 430 of FIG. 4 and/or FIG. 5) may be disposed on the image plane.

When the camera (e.g., 400 of FIG. 4) senses an external image corresponding to a user's gaze (e.g., the first camera 280-1, the second camera 280-2, or the third camera 280-3 of FIG. 2), the image sensor 430 may detect light having a wavelength in the visible band. The wavelength in the visible band may be a wavelength between 400 nm and 700 nm, and due to a refractive index difference between wavelengths, imaging positions may differ from one another depending on the wavelengths. The phenomenon in which the imaging positions differ from one another depending on the wavelengths is called chromatic aberration.

In an embodiment, the lens module 600 may include the meta-lenses having negative refractive power and the meta-lenses having positive refractive power and thus may improve the chromatic aberration. In addition, through the meta-lenses having negative refractive power and the meta-lenses having positive refractive power, the lens module 600 may cause the focus of light having a wavelength in the visible band to be formed on the image plane.

When the camera 400 senses an image corresponding to the user's eyes (or, pupils) (e.g., the first eye-tracking sensor 276-1 or the second eye-tracking sensor 276-2 of FIG. 2, or the eye-tracking sensor 371 of FIG. 3), the image sensor 430 may detect light having a wavelength in the infrared band.

In an embodiment, the camera 400 may detect an image of an infrared wavelength that corresponds to a wavelength range of 60 nm from a central wavelength provided by an LED emitting light in the infrared band.

In an embodiment, in the eye-tracking sensor 276-1, 276-2, or 371 included in the wearable electronic device (e.g., 201 of FIG. 2), the distance between an object being sensed and the light incident plane of the lens module 600 may range from 10 mm to 40 mm. In this case, the angle of view at which the lens module 600 easily senses an image in a direction corresponding to the user's eyes may be greater than or equal to 40°. In addition, the back focus length BFL between the lens module 600 and the image plane may, for example, range from 0.02 mm to 0.05 mm. The angle of view of the lens module 600 may be determined depending on the distance between the image plane and the lens module 600, the distance between the lens module 600 and the object being sensed, and the distance between the meta-lenses included in the lens module 600.

The distance between the first meta-lens 412 and the second meta-lens 414 may be a first distance L1. In addition, the distance between the second meta-lens 414 and the third meta-lens 416 may be a second distance L2. For example, the first distance L1 may be in agreement with the thickness of the first substrate 413. Furthermore, the second distance L2 may be in agreement with the thickness of the second substrate 415.

In an embodiment, the thicknesses of the first substrate 413 and the second substrate 415 may be adjusted such that the second distance L2 is three or more times greater than the first distance L1. As the second distance L2 is adjusted to be three or more times greater than the first distance L1, the angle of view of the lens module 600 that has a distance of 10 mm to 40 mm from the object being sensed and has a back focus length BFL of 0.02 mm to 0.05 mm may be greater than or equal to 40°.

In an embodiment, the total thickness TTL of the lens module 600 may be less than or equal to a preset value. As the total thickness TTL of the lens module 600 is less than or equal to the preset value (e.g., 1.7 mm), the camera may be easily mounted in the wearable electronic device 201.

In an embodiment, the width LW1 of the first meta-lens 412 may be smaller than the width LW3 of the third meta-lens 416. In addition, the width LW1 of the first meta-lens 412 may be smaller than the width D3 of the third substrate 417. The width D3 of the third substrate 417 may be equal to the width of the light exit plane.

In an embodiment, the width LW2 of the second meta-lens 414 may be smaller than the width LW3 of the third meta-lens 416. In addition, the width LW2 of the second meta-lens 414 may be smaller than the width D3 of the third substrate 417. For example, the width LW1 of the first meta-lens 412, the width LW2 of the second meta-lens 414, and the width LW3 of the third meta-lens 416 may be less than or equal to 0.8 times the width D3 of the third substrate 417.

The width LW1 of the first meta-lens 412, the width LW2 of the second meta-lens 414, and the width LW3 of the third meta-lens 416 may be determined depending on the total thickness TTL of the lens module 600 and the angle of view of the lens module 600. For example, when the total thickness TTL of the lens module 600 is less than or equal to 1.7 mm and the angle of view of the lens module 600 is greater than or equal to 40°, the width LW1 of the first meta-lens 412, the width LW2 of the second meta-lens 414, and the width LW3 of the third meta-lens 416 may be less than or equal to 1 mm.

In an embodiment, portions of the first substrate 413, the second substrate 415, and the third meta-lens 416 may be diced according to the manufacturing process of the lens module 600. By the dicing, the width D1 of the first substrate 413 may be equal to the width D2 of the second substrate 415. In addition, the width D2 of the second substrate 415 may be equal to the width LW3 of the third meta-lens 416.

In an embodiment, the width D3 of the third substrate 417 may be greater than the width D1 of the first substrate 413 or the width D2 of the second substrate 415. The width D3 of the third substrate 417 may be equal to the width of the light exit plane.

The width D3 of the third substrate 417 may be a width required for the exit light, which is guided by the lens module 600 and passes through the lens module 600, to form a focus on the light receiving region (e.g., 431 of FIG. 5) located on the image plane.

Figure 7:
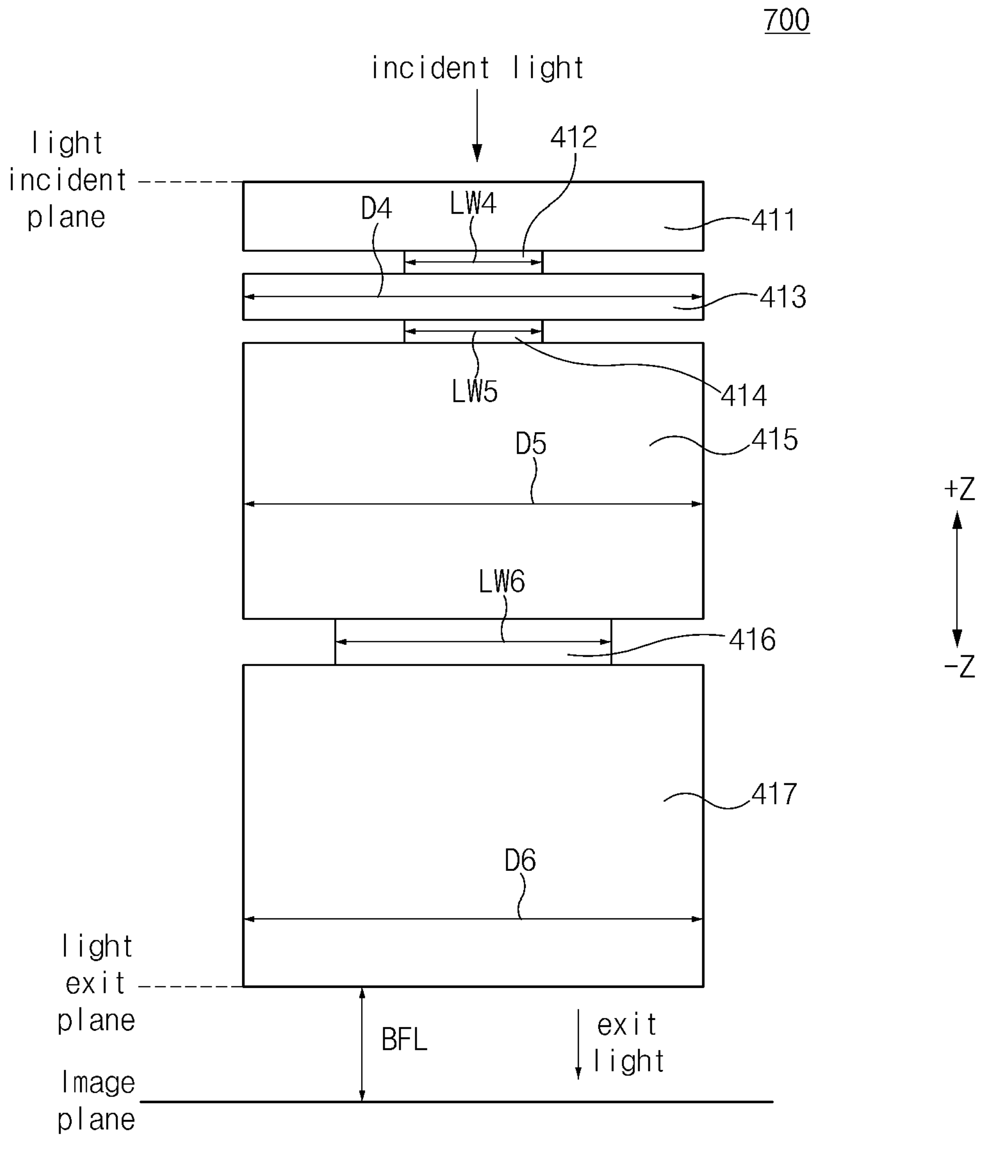
FIG. 7 is a sectional view illustrating some components included in a camera according to another example embodiment.

FIG. 7 is a sectional view illustrating some components included in a camera (e.g., 400 of FIG. 4) according to another embodiment. Hereinafter, a lens module 700 included in the camera (e.g., 400 of FIG. 4) will be described with reference to FIG. 7.

As illustrated in FIG. 7, the lens module 700 according to an embodiment may include a protective layer 411, a first meta-lens 412, a first substrate 413, a second meta-lens 414, a second substrate 415, a third meta-lens 416, and a third substrate 417, and repetitive descriptions identical to ones given with reference to FIG. 6 will be omitted.

In a manufacturing process of the lens module 700, the first substrate 413, the second substrate 415, and the third substrate 417 may be simultaneously diced. As the first substrate 413, the second substrate 415, and the third substrate 417 are simultaneously diced, the width D4 of the first substrate 413, the width D5 of the second substrate 415, and the width D6 of the third substrate 417 may be equal. According to an embodiment, the lens module 700 may be simultaneously diced together with an image sensor (e.g., 430 of FIG. 4 and/or FIG. 5).

As the first substrate 413, the second substrate 415, and the third substrate 417 are simultaneously diced, the manufacturing process of the lens module 700 may be simplified, and manufacturing costs may be reduced.

For example, when the refractive powers of the first meta-lens 412, the second meta-lens 414, and the third meta-lens 416 are increased, a focus may be formed on a reduced light receiving region 431. The refractive powers of the first meta-lens 412, the second meta-lens 414, and the third meta-lens 416 may be adjusted by varying the refractive indexes of nanostructures included in the respective meta-lenses. As the width occupied by the light receiving region 431 is decreased, the width D6 of the third substrate 417, which is a width required to form the focus on the light receiving region 431, may be decreased. When the width D6 of the third substrate 417 is decreased, the size of the lens module 700 may be decreased, and the first substrate 413, the second substrate 415, and the third substrate 417 may be simultaneously diced.

Figure 8:
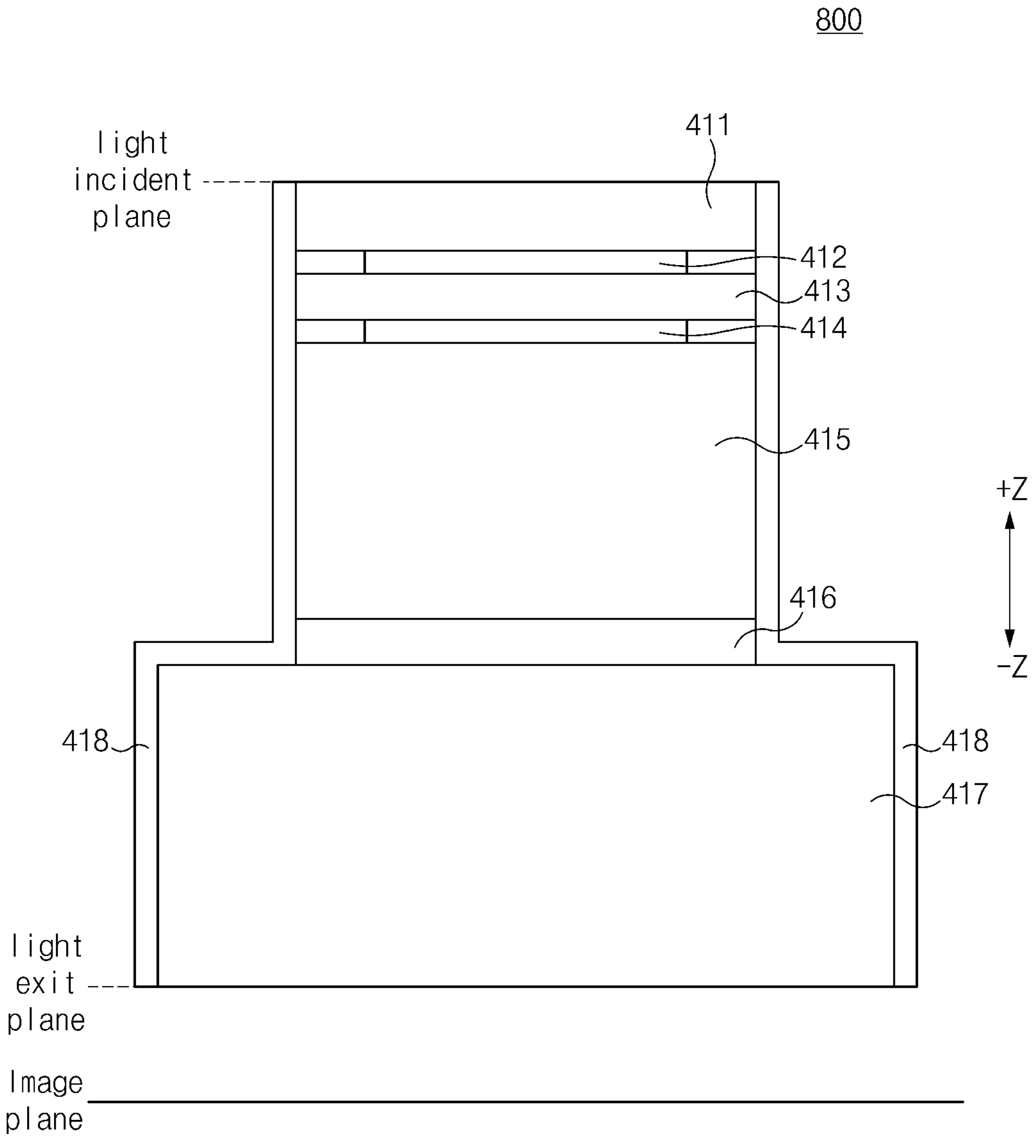
FIG. 8 is a sectional view illustrating some components included in a camera according to another example embodiment.

FIG. 8 is a sectional view illustrating some components included in a camera (e.g., 400 of FIG. 4) according to another embodiment. Hereinafter, a lens module 800 included in the camera (e.g., 400 of FIG. 4) will be described with reference to FIG. 8.

As illustrated in FIG. 8, the lens module 800 may include a protective layer 411, a first meta-lens 412, a first substrate 413, a second meta-lens 414, a second substrate 415, a third meta-lens 416, and a third substrate 417, and repetitive descriptions identical to ones given with reference to FIG. 6 will be omitted.

In an embodiment, the lens module 800 may include a light blocking film 418 in contact with at least one surface other than a light incident plane of the lens module 800 and a light exit plane of the lens module 800. For example, the light blocking film 418 may be formed in contact with a side surface of the protective layer 411, a side surface of the first substrate 413, a side surface of the second substrate 415, and a side surface of the third substrate 417. In some embodiments, the light blocking film 418 may be formed in contact with a surface not overlapping the second substrate 415 of one surface (e.g., a surface in the +Z-axis direction) of the third substrate 417 on the light incident plane side.

In an embodiment, the light blocking film 418 may block light incident to the surface other than the light incident plane. The light incident to the surface other than the light incident plane may generate a noise signal in an image sensor (e.g., 431 of FIG. 5). As the light incident to the surface other than the light incident plane is blocked, a noise component generated in the image sensor 431 may be reduced.

In an embodiment, the light blocking film 418 may be implemented with a plurality of layers or a single layer. When the light blocking film 418 is implemented with the single layer, the thickness of the light blocking film 418 may be minimized or reduced, and the size of the lens module 800 may be decreased.

In an embodiment, the light blocking film 418 may include a light absorbing material that absorbs light in a preset wavelength band. For example, the light blocking film 418 may include a carbon-based organic material. In another embodiment, the light blocking film 418 may include a reflective material that reflects light. The light blocking film 418 may block light incident to the surface other than the light incident plane through the reflective material. For example, the light blocking film 418 may include metal such as chromium (Cr).

In an embodiment, the wavelength band of light absorbed and/or reflected by the light blocking film 418 may vary depending on the wavelength band detected by the camera (e.g., 400 of FIG. 4) including the lens module 800. For example, when the camera 400 including the lens module 800 obtains an image in a direction corresponding to a user's eyes, the camera 400 may detect light having a wavelength in the infrared band. The light blocking film 418 may include a material that absorbs and/or reflects light having a wavelength in the infrared band. As the light blocking film 418 absorbs and/or reflects light having a wavelength in the infrared band, the light blocking film 418 may reduce noise caused by light incident to the surface other than the light incident plane.

Figure 9:
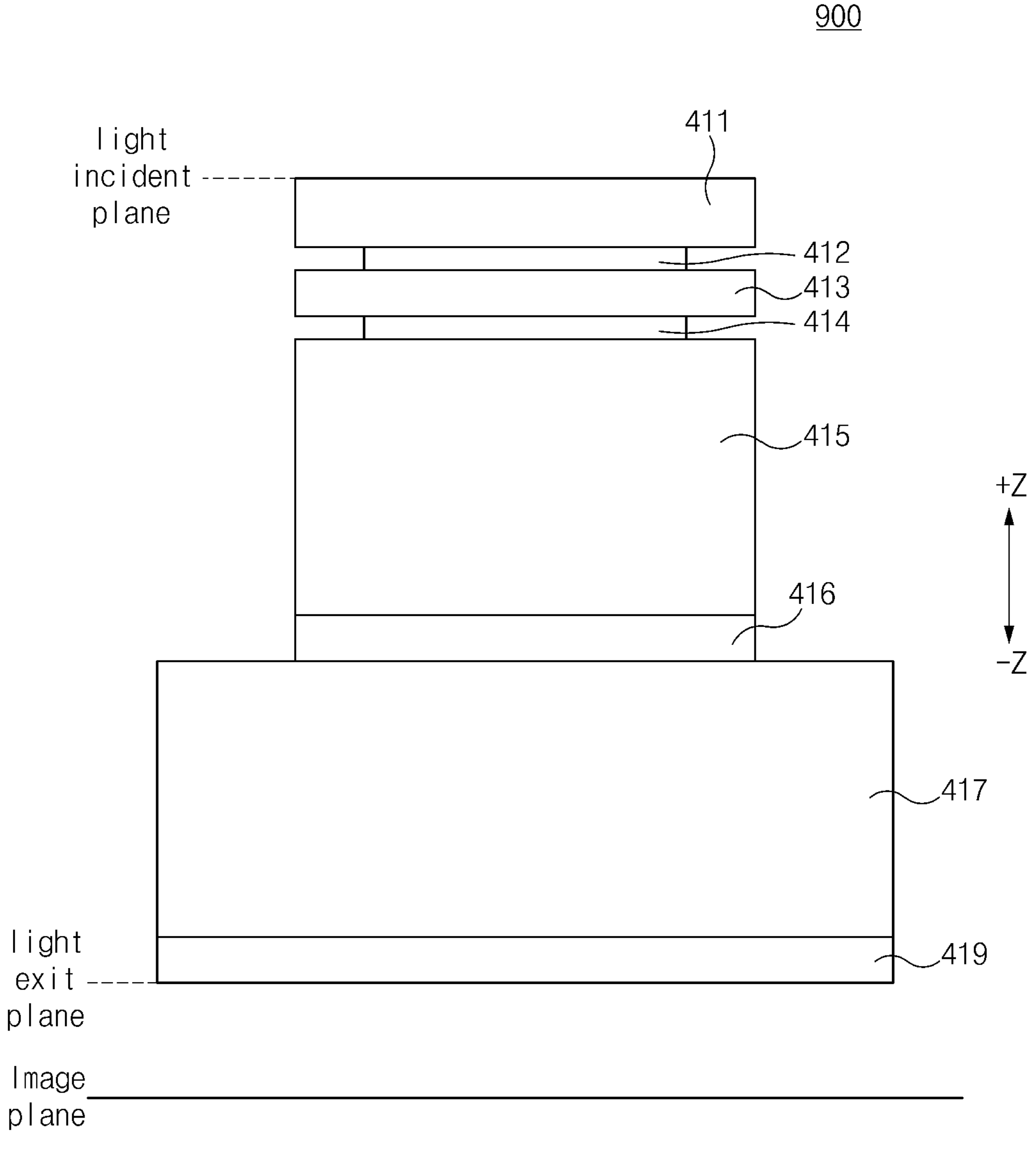
FIG. 9 is a sectional view illustrating some components included in a camera according to another example embodiment.

FIG. 9 is a sectional view illustrating some components included in a camera (e.g., 400 of FIG. 4) according to another embodiment. Hereinafter, some components of a lens module 900 included in the camera will be described with reference to FIG. 9.

As illustrated in FIG. 9, the lens module 900 may include a protective layer 411, a first meta-lens 412, a first substrate 413, a second meta-lens 414, a second substrate 415, a third meta-lens 416, and a third substrate 417, and repetitive descriptions identical to ones given with reference to FIG. 6 will be omitted.

In an embodiment, the lens module 900 may include an optical filter 419 disposed on a light exit plane side of the lens module 900. The optical filter 419 may be in contact with the light exit plane of the lens module 900, and a bonding member (e.g., 420 of FIG. 4 and/or FIG. 5) may bond the optical filter 419 and an image sensor (e.g., 430 of FIG. 4 and/or FIG. 5).

In an embodiment, the optical filter 419 may selectively pass light incident to the lens module 900 depending on wavelengths. The optical filter 419 may selectively transmit light rays in a partial wavelength range among incident light rays and may block the rest. The transmitted light rays may travel toward an image plane through the light exit plane.

In an embodiment, characteristics of the optical filter 419 may be expressed through a central wavelength having maximum transmittance, full width at half maximum that is a bandwidth of a wavelength having a transmittance corresponding to 50% of the maximum transmittance, and a cut-off range that is an energy spectrum range attenuated by the optical filter 419.

For example, in the optical filter 900 that transmits infrared light, an infrared wavelength to be detected may be the central wavelength. In addition, the full width at half maximum of the optical filter 419 that transmits infrared light may be 60 nm.

In an embodiment, the optical filter 419 may selectively transmit light by selectively absorb light in a preset wavelength band. The blocked light may be absorbed and stored in the optical filter 419. The optical filter 419 that blocks light through absorption may include a material having absorption characteristics for light in the preset wavelength band. The optical filter 419 may include a plurality of layers having absorption characteristics for light in different wavelength bands.

In another embodiment, the optical filter 419 may selectively transmit light by selectively reflecting light in a preset wavelength band. Light may have different refractive characteristics for respective wavelengths. The optical filter 419 that blocks light through reflection may include a plurality of layers having different refractive indexes. The optical filter 419 may adjust an optical path using refraction characteristics for respective wavelengths for the plurality of layers such that light to be blocked does not pass through the light exit plane.

In an embodiment, the wavelength band of light transmitted by the optical filter 419 may vary depending on the wavelength band detected by the camera (e.g., 400 of FIG. 4) including the lens module 900. For example, when the camera 400 including the lens module 900 obtains an image in a direction corresponding to a user's eyes, the camera 400 may detect light having a wavelength in the infrared band, and the optical filter 419 may pass light having a wavelength in the infrared band and may absorb and/or reflect light in a wavelength band other than the infrared band.

A wearable electronic device according to an embodiment may include a frame (e.g., the frame 297 of FIG. 2), a first temple (e.g., the first temple 298-1 of FIG. 2) connected, directly or indirectly, to one side of the frame, a second temple (e.g., the second temple 298-2 of FIG. 2) connected, directly or indirectly, to an opposite side of the frame, and a camera (e.g., the camera 400 of FIG. 4) located in one region of the frame. The camera may include a lens module (e.g., the lens module 410 of FIG. 4) including at least one meta-lens (e.g., the first meta-lens 412, the second meta-lens 414, and/or the third meta-lens 416 of FIG. 6) in which nanostructures are arranged in two dimensions and an image sensor (e.g., the image sensor 430 of FIG. 4) that detects light guided by the lens module.

In an embodiment, the lens module may include a protective layer (e.g., the protective layer 411 of FIG. 6) disposed on a light incident plane side of the lens module.

In an embodiment, the lens module may include a light blocking film (e.g., the light blocking film 418 of FIG. 8) in contact with at least one surface other than a light incident plane of the lens module and a light exit plane of the lens module.

In an embodiment, the lens module may include an optical filter (e.g., the optical filter 410 of FIG. 9) disposed on a light exit plane side of the lens module, and the optical filter may selectively pass light in a preset wavelength band.

In an embodiment, the camera may include a bonding member (e.g., the bonding member 420 of FIG. 4) that bonds the lens module and the image sensor, and the bonding member may be located between a light exit plane of the lens module and the image sensor.

In an embodiment, the lens module may include a substrate (e.g., the first substrate 413, the second substrate 415, and/or the third substrate 417 of FIG. 6), and the at least one meta-lens may be located on, directly or indirectly, the substrate.

In an embodiment, the substrate may have a refractive index different from a refractive index of the nanostructures included in the at least one meta-lens.

In an embodiment, the camera may be configured to obtain an image in a direction corresponding to a user's gaze.

In an embodiment, the camera may be configured to obtain an image corresponding to at least a portion of a user's eye.

A camera according to an embodiment (e.g., the camera 400 of FIG. 4) may include a lens module (e.g., the lens module 410 of FIG. 4) including at least one meta-lens (e.g., the first meta-lens 412, the second meta-lens 414, and/or the third meta-lens 416 of FIG. 6) in which nanostructures are arranged in two dimensions, an image sensor (e.g., the image sensor 430 of FIG. 4) that detects light guided by the lens module, and a bonding member (e.g., the bonding member 420 of FIG. 4) that bonds a light exit plane of the lens module and the image sensor. The image sensor may include a light receiving region (e.g., the light receiving region 431 of FIG. 5) that converts received light into an electrical signal and a peripheral region (e.g., the peripheral region 432 of FIG. 5) that is located around the light receiving region. One surface of the bonding member may be in contact with one region of the lens module, and another surface of the bonding member may be in contact with the peripheral region of the image sensor.

In an embodiment, the lens module may include a protective layer (e.g., the protective layer 411 of FIG. 6) disposed on a light incident plane side of the lens module.

In an embodiment, the lens module may include a light blocking film (e.g., the light blocking film 418 of FIG. 8) in contact with at least one surface other than a light incident plane and the light exit plane of the lens module.

In an embodiment, the lens module may include an optical filter (e.g., the optical filter 410 of FIG. 9) disposed on a light exit plane side of the lens module, and the optical filter may selectively pass light in a preset wavelength band.

In an embodiment, the lens module may include a first meta-lens (e.g., the first meta-lens of FIG. 6) disposed on a light incident plane side of the lens module, a first substrate (e.g., the first substrate 413 of FIG. 6) in contact with the bottom of the first meta-lens, a second meta-lens (e.g., the second meta-lens 414 of FIG. 6) in contact with the bottom of the first substrate, a second substrate (e.g., the second substrate 415 of FIG. 6) in contact with the bottom of the second meta-lens, a third meta-lens (e.g., the third meta-lens 416 of FIG. 6) in contact with the bottom of the second substrate, and a third substrate (e.g., the third substrate 417 of FIG. 6) in contact with the bottom of the third meta-lens.

In an embodiment, a first distance (e.g., the first distance L1 of FIG. 6) between the first meta-lens and the second meta-lens may be smaller than a second distance (e.g., the second distance L2 of FIG. 6) between the second meta-lens and the third meta-lens.

In an embodiment, a width of the first meta-lens (e.g., the width LW1 of the first meta-lens of FIG. 6) may be smaller than a width of the third meta-lens (e.g., the width LW3 of the third meta-lens of FIG. 6).

In an embodiment, a width of the second meta-lens (e.g., the width LW2 of the second meta-lens of FIG. 6) may be smaller than a width of the third meta-lens.

In an embodiment, a width of the third meta-lens may be smaller than a width of the light exit plane, and the width of the light exit plane may be equal to a width of the third substrate (e.g., the width D3 of the third substrate of FIG. 6).

In an embodiment, a width of the first substrate (e.g., the width D1 of the first substrate of FIG. 6) and a width of the second substrate (e.g., the width D2 of the second substrate of FIG. 6) may be smaller than a width of the third substrate (e.g., the width D3 of the third substrate of FIG. 6).

In an embodiment, a width of the first substrate (e.g., the width D4 of the first substrate of FIG. 7) may be equal to a width of the second substrate (e.g., the width D5 of the second substrate of FIG. 7), and the width of the second substrate may be equal to a width of the third substrate (e.g., the width D6 of the third substrate of FIG. 7).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A wearable electronic device comprising:

a frame;

a first temple connected to a side of the frame;

a second temple connected to an opposite side of the frame; and a camera located in a region of the frame, wherein the camera includes a lens module including at least one meta-lens comprising nanostructures arranged in at least two dimensions and an image sensor configured to detect light guided by the lens module, wherein the lens module further includes a protective layer disposed on a light incident plane side of the lens module and a substrate on which the at least one meta-lens is located, wherein the lens module further includes a light blocking film in contact with at least one of a side surface of the protective layer and a side surface of the substrate, the light blocking film being configured to block stray light incident to the at least one side surface such that a noise component generated in the image sensor is reduced.

2. The wearable electronic device of claim 1, wherein the lens module further includes an optical filter disposed on a light exit plane side of the lens module, and wherein the optical filter is configured to selectively pass light in a preset wavelength band.

3. The wearable electronic device of claim 1, wherein the camera includes a bonding member configured to bond the lens module and the image sensor, and wherein the bonding member is located between at least a light exit plane of the lens module and the image sensor.

4. The wearable electronic device of claim 1, wherein the lens module further includes a substrate, and the at least one meta-lens is located on the substrate.

5. The wearable electronic device of claim 4, wherein the substrate has a refractive index different from a refractive index of the nanostructures included in the at least one meta-lens.

6. The wearable electronic device of claim 1, wherein the camera is configured to obtain an image in a direction corresponding to a user's gaze.

7. The wearable electronic device of claim 1, wherein the camera is configured to obtain an image corresponding to at least a portion of a user's eye.

8. A camera comprising:

a lens module including at least one meta-lens comprising nanostructures arranged in first and second dimensions;

an image sensor configured to detect light guided by the lens module; and a bonding member, comprising bonding material, configured to bond at least a light exit plane of the lens module and the image sensor, wherein the image sensor includes a light receiving region configured to convert received light into an electrical signal and a peripheral region located at least partially around the light receiving region, wherein a surface of the bonding member is in contact with a region of the lens module, and another surface of the bonding member is in contact with the peripheral region of the image sensor, wherein the bonding member does not overlap the light receiving region, and wherein the lens module further includes a protective layer disposed on a light incident plane side of the lens module and a substrate on which the at least one meta-lens is located, wherein the lens module further includes a light blocking film in contact with at least one of a side surface of the protective layer and a side surface of the substrate, the light blocking film being configured to block stray light incident to the at least one side surface such that a noise component generated in the image sensor is reduced.

9. The camera of claim 8, wherein the lens module further includes an optical filter disposed on a light exit plane side of the lens module, and the optical filter is configured to selectively pass light in a preset wavelength band.

10. The camera of claim 8, wherein the lens module includes:

a first meta-lens disposed on a light incident plane side of the lens module;

a first substrate in contact with the bottom of the first meta-lens;

a second meta-lens in contact with the bottom of the first substrate;

a second substrate in contact with the bottom of the second meta-lens;

a third meta-lens in contact with the bottom of the second substrate; and a third substrate in contact with the bottom of the third meta-lens.

11. The camera of claim 10, wherein a first distance between the first meta-lens and the second meta-lens is smaller than a second distance between the second meta-lens and the third meta-lens.

12. The camera of claim 10, wherein the first meta-lens has a smaller width than the third meta-lens.

13. The camera of claim 10, wherein the second meta-lens has a smaller width than the third meta-lens.

14. The camera of claim 10, wherein the third meta-lens has a smaller width than the light exit plane, and the light exit plane has substantially the same width as the third substrate.

15. The camera of claim 10, wherein a width of the first substrate and a width of the second substrate are smaller than a width of the third substrate.

16. The camera of claim 10, wherein the first substrate has substantially the same width as the second substrate, and the second substrate has substantially the same width as the third substrate.

* * * * *